INVENTOR
Bernhard Seiler

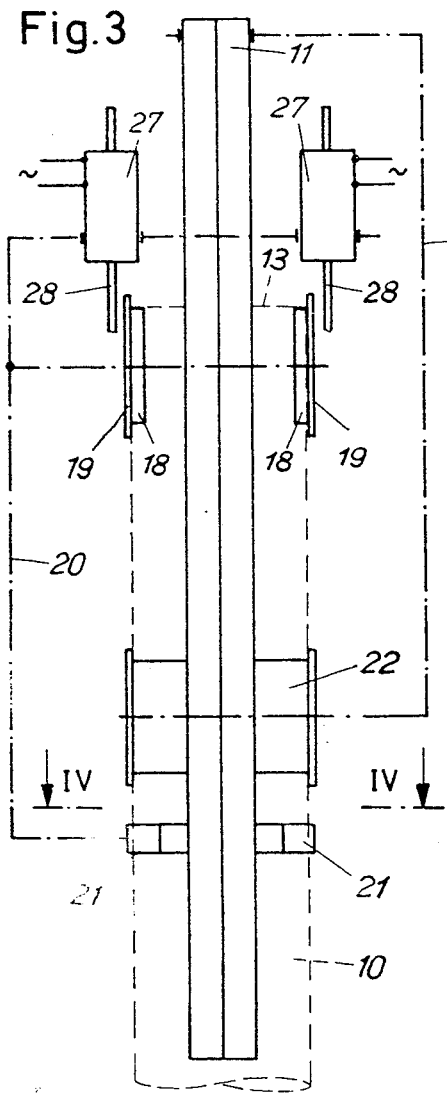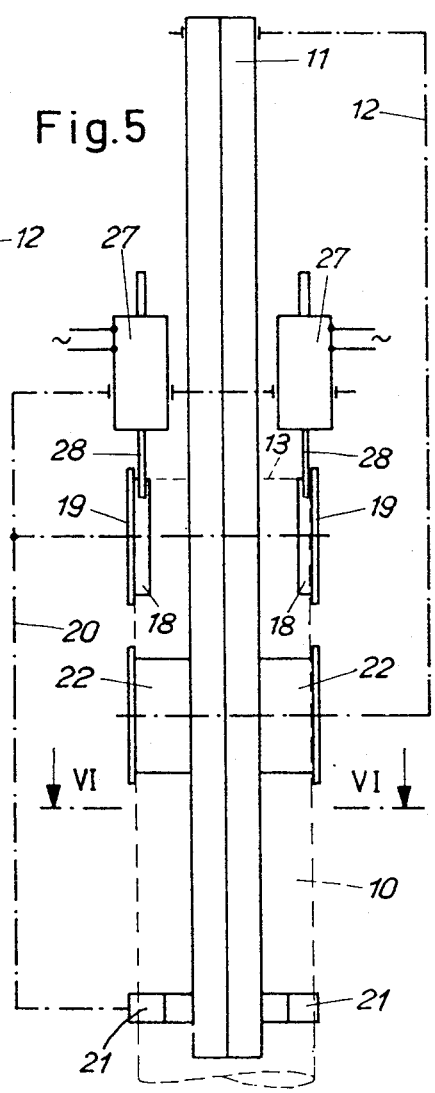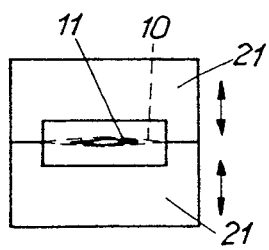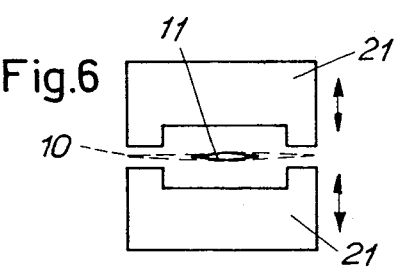

United States Patent Office 3,752,724
Patented Aug. 14, 1973

3,752,724
METHOD OF AND APPARATUS FOR MAKING FLAT PLASTIC TUBING
Bernhard Seiler, Zurich, Switzerland, assignor to Emil Hartmann, Zurich, Switzerland
Filed Aug. 20, 1970, Ser. No. 65,593
Claims priority, application Switzerland, Aug. 26, 1969, 12,944/69
Int. Cl. B32b *31/00, 31/04*
U.S. Cl. 156—351                6 Claims

ABSTRACT OF THE DISCLOSURE

A method of an apparatus for making plastic tubing by marginally securing plastic sheet material strips supplied from coils and brought together about a blowtube along which the plastic tube is advanced and moved beyond the end of the blowtube for a purpose such as to be formed into plastic containers. A step-and-repeat mechanism successively advances completed sectional lengths of the plastic tube beyond the end of the blowtube for processing into containers, and in each cycle completing another sectional length of the plastic tubing.

---

This invention relates to a method of and apparatus for making flat plastic tubing, and is more particularly concerned with providing such tubing for use in forming containers, for example according to the teachings of Pat. No. 3,459,841 issued Aug. 5, 1969.

According to prior method and apparatus as represented, for example, by the disclosure in the aforementioned patent, flat plastic tubing rolled upon a reel has been fed therefrom to the container-making apparatus, and it has been necessary to supply compressed air through the entire length of the tubing from its reel-carried end so that the tubing could be expanded by the air after successive lengths of the advancing tubing were received in heating apparatus preparatory to reception of the expanded portion of the tubing in a two-part vacumn forming mold.

According to the present invention a substantial improvement upon the prior arrangement has been effected by providing for the production of the flat plastic tubing from thermoplastic strip stock of suitable gauge in a manner adapting the tube forming to be an immediately preceding activity in a container producing system or apparatus.

An important object of the present invention is to provide a new and improved method of producing plastic tubing from preformed strip stock.

Another object of the invention is to provide new and improved apparatus for making plastic tubing from preformed strip stock.

A further object of the invention is to provide a new and improved method of and apparatus for producing thermoplastic tubing as the initial phase for a container making machine.

Another object of the invention is to provide a new and improved method of and apparatus for making thermoplastic tubing in a step-by-step fashion to be correlated with operation of apparatus for producing containers from the tubing.

Still another object of the invention is to provide a new and improved method of and apparatus for producing thermoplasic tubing about a blowtube.

Other objects, features and advantages of the invention will be readily apparent from the following description of a preferred embodiment thereof, taken in conjunction with the accompanying drawings, although variations and modifications may be effected without departing from the spirit and scope of the novel concepts embodied in the disclosure, and in which:

FIG. 3 is a vertical elevational view taken substantially along the line III—III of FIG. 1;

FIG. 4 is a fragmentary sectional plan detail taken substantially along the line IV—IV of FIG. 3;

FIG. 5 is a view similar to FIG. 3 but showing the apparatus in a different relationship in the cycle of operation; and FIG. 6 is a sectional detail plan view taken substantially along the line VI—VI of FIG. 5.

Figure 1:
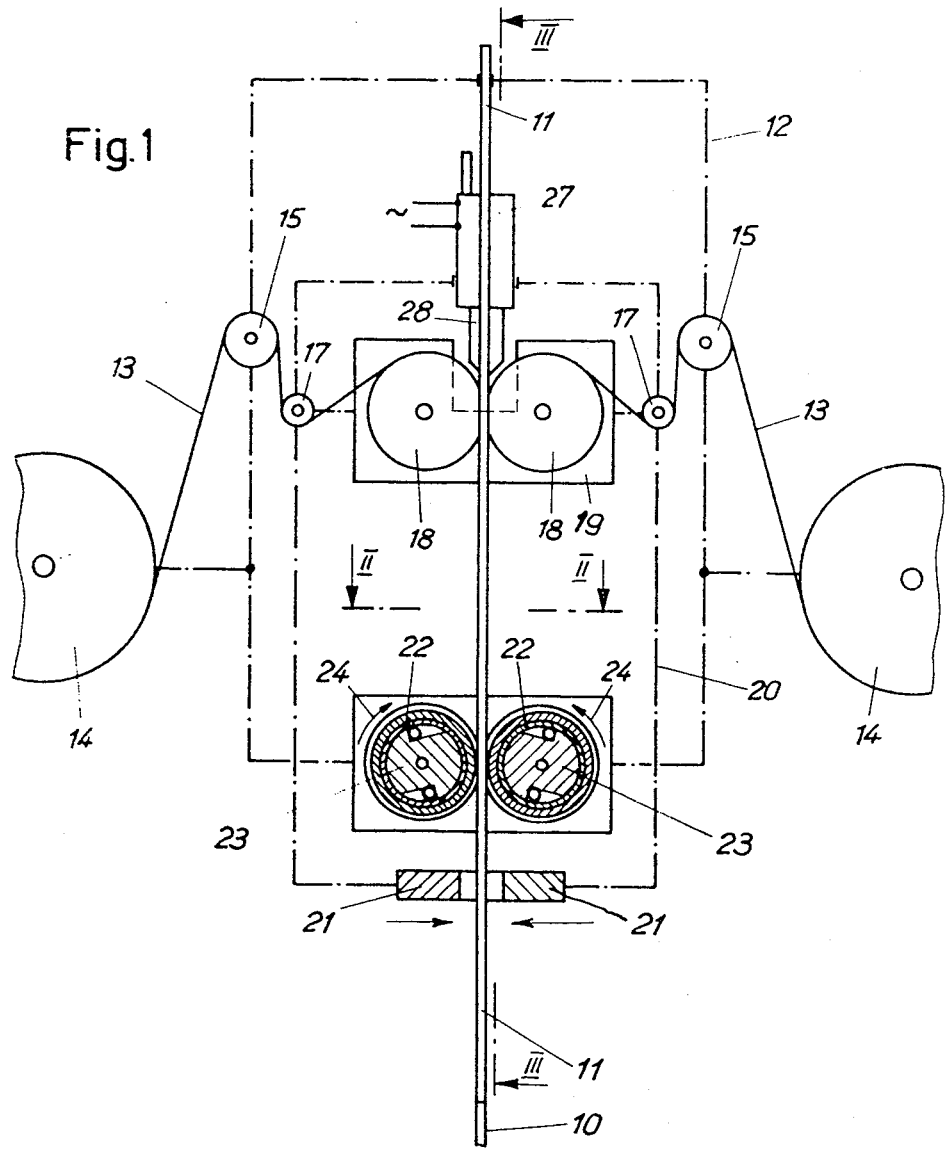
FIG. 1 is a schematic partially sectional elevational view showing apparatus pursuant to the principles of the present invention.
Figure 2:
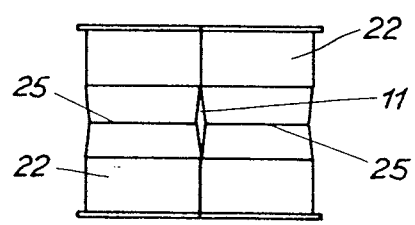
FIG. 2 is a fragmentary detail sectional plan view taken substantially along the line II—II of FIG. 1.

An understanding of the method according to the present invention will be gained as the description proceeds of the apparatus disclosed by way of example in the drawings. As the end product of the present method thermoplastic tubing 10 is provided of a character and dimension suitable for making containers, for example, according to the aforementioned patent 3,459,841. According to the method and apparatus exemplified in that patent, plastic tubing through which compressed air is supplied from its reel end is pulled from the reel and conducted step-by-step through a heating apparatus and enlarged therein by the compressed air, whereafter successive sections of the tube are engaged within a separable mold wherein the containers are vacuum formed one at a time, the successively produced containers being then separated from the tube.

According to the present invention, a substantially improved manner of supplying the compressed air for expanding the tubing just before it is sectionally engaged within the container-forming mold is by introducing the air into the tubing 10 relatively close to the point at which the tubing is heated and expanded. Herein this is accomplished by means of a blowtube 11 about which the tubing is formed so that the discharge end of the blowtube is efficiently located downstream within the tubing which is advanced step-by-step along the blowtube, while the opposite end portion of the blowtube is located outside of and upstream from the point of formation of the tubing so as to be free for connection to a suitable source of compressed air. For this purpose, the blowtube 11 is supported at its outer end portion by a suitable stationary apparatus frame 12.

In the formation of the thermoplastic tubing 10 about the blowtube 11, flat thermoplastic strip material stock in two strips 13 is derived from respective supply sources desirably in the form of a pair of coiled rolls 14 of the strip stock supported on the frame 12. From the supply rolls 14, the strips 13 are fed over idler pulleys or rollers 15 mounted on the frame 12 and then about reversing idler pulleys or rollers 17 to and about cooperating forming press rollers 18 flanked by guide panels 19 and operatively related to the tube 11 to guide the strips 13 into engagement with respect opposite sides of the blowtube and pressing the confronting margins of the thermoplastic strips together.

Joining of the thermoplastic strips 13 is desirably effected step-by-step or in series sections in timed relation to the cycles of operation of the container-forming apparatus of the machine with which the presently disclosed apparatus may be cooperatively associated. To this end, the reversing rollers 17 and the pressing rollers 18 are arranged as part of a step-and-repeat mechanism comprising a reciprocating supporting carriage frame 20 on which the rollers 17 and 18 are mounted for movement therewith in reciprocal operating cycles longitudinally along the tube 11 as indicated by the double directional arrow in FIG. 1.

At the start of a cycle of operation of the tube forming apparatus, the carriage 20 is in the retracted position relative to the stationary supporting frame 12 as shown in FIGS. 1 and 3. In this position, a pair of separable clamping jaws 21 carried by the carriage 20 at its end nearest the discharge end of the tube 11 grip the tubing 10 at opposite sides of and free from interference with the tube 11 (FIG. 4). Thereby as the carriage 20 moves in the protractional direction relative to the stationary frame 12 the gripped tubing 10 is advanced by the jaws 21 along the tube 11 by the desired sectional increment for charging the tubing into the container-shaping apparatus. As the carriage 20 advances relative to the frame 12, the rollers 17 draw over the rollers 15 from the supply rolls 14 respective identical lengths of strip stock to form the next succeeding section of the tubing 10.

After the carriage 20 has reached the limit of advancing movement in its operating cycle, namely the lower terminal position shown in FIG. 5, the jaws 21 are opened to release the tubing (FIG. 6) and the carriage is caused to retract or retreat relative to the tube 11 and the frame 12 to the upper limits shown in FIGS. 1 and 3. At this time the next succeeding portion of the tubing 10 is completed. To this end, means are provided for holding the tubing 10 against returning with the carriage 20 while at the same time securing the lapping margins of the strips 13 together. Means for holding the tubing 10 against retreating but permitting free advance of the tubing comprise a pair of one-way gripping rollers 22 rotatably mounted on the stationary frame 12 to engage the completed tubing 10 near but ahead of the retracted position of the clamping and advancing jaws 21. These gripping rollers are carried by respective one-way clutches 23 which permit the rollers 22 to freewheel in the advancing direction of the tubing 10 as indicated by the arrows 24, but positively hold the rollers 22 against return rotation. Thereby the tubing 10 gripped between the rollers 22 moves freely along the blow-tube 14 through the rollers 22 as the jaws 21 advance the tubing, and when the jaws 21 release the tubing and the mechanism carriage 20 returns, the tubing 10 is held stationary with the tube 11 against retreating by the one-way gripping rollers 22. To clear the blowtube 11 therebetween, the rollers 22 are provided with respective clearance grooves 25 generally complementary to the shape of the tube 11, which in this instance is shown as generally flattened with oppositely arched walls providing a hollow air duct passage from end-to-end therethrough.

As the tubing 10 is held by the gripping rollers 22 during the retreat of the carriage 20, heat is applied to the margins of the strips 13 in those portions that have been drawn by the rollers 17 for the formation of the next succeeding sectional increment of the tubing so that as the forming rollers 18 are moved in the retracting or return stroke of the carriage 20 the softened plastic margins of the thermoplastic material will be squeezed together and bonded and thus seal the strips into the tubing form. For this purpose, heated air is supplied by hot air blowers carried by the reciprocating carriage 20 and equipped with nozzles 28 which are dimensioned for selectively applying the heated air to the margins of the strips 13 just as they enter the nip of the rollers 18 (FIGS. 1 and 5). As a result, as the rollers 18 run along and squeeze the margins of the strips 13 together while the carriage 20 is in the retreating movement of its operating cycle, the strip margins are sealingly bonded together. In order to avoid overheating of any portion of the strip margins, the blowers 27 and the nozzles 28, or at least the nozzles, are mounted to be shifted outwardly away from the margins of the strips and the rollers 18, substantially as shown in FIG. 3, during the advancing movement of the carriage 20, being returned to the registered or aligned relation with the strip margins coordinated with the returning movement of the carriage.

At the start of operation, the ends of the strips 13 are threaded over and about the rollers 15, 17 and 18 and advanced through the rollers 22 and the gripping jaws 21. The apparatus can then be operated automatically and continuously as long as the supply of the thermoplastic strip stock permits.

It will be understood that variations and modifications may be effected without departing from the spirit and scope of the novel concepts of this invention.

I claim as my invention:

1. Apparatus for making plastic tubing comprising in combination:
   a blowtube;
   means for feeding opposed strips of thermoplastic stock into confronting relation to one another about said blowtube with the margins of the strips in lapping confronting relation at opposite sides of the tube;
   heating means movable between an operational position in registry with the strip margins for heating the margins and a rest position away from the strips;
   means for progressively sealing the heated margins together to complete the tubing;
   means for intermittently advancing the tubing along said blowtube and beyond an end of the blowtube;
      said heating means being moved to said rest position during advancing of the tubing by said advancing means; and
   carriage means carrying said heating means and said sealing means and movable with the stock in an advancing stroke in the direction of stock feed with the stock being stationary in a return stroke of the carriage;
      said heating means being in said operational position and heating the margins in said return stroke;
      said sealing means sealing the heated margins together in said return stroke.

2. Apparatus for making plastic tubing constructed in accordance with claim 1:
   including means for locking the position of the strips while said carriage is moving in its return stroke.

3. Apparatus for making plastic tubing constructed in accordance with claim 1:
   wherein said heating means includes air jets for directing a flow of heated air against the margins of the strips and includes means for heating the air.

4. Apparatus for making plastic tubing constructed in accordance with claim 1:
   wherein said sealing means includes opposed pressure rollers for engaging the heated margins.

5. Apparatus for making plastic tubing constructed in accordance with claim 1:
   wherein said advancing means includes clamps mounted on the carriage means and movable to clamp said strips in the advancing stroke of the carriage and releasing the strips in the return stroke.

6. Apparatus for making plastic tubing constructed in accordance with claim 1:
including means for preventing return of the strips during the return stroke of the carriage including gripping rollers freely movable in the feed direction of the tubing and automatically locking to grip the tubing in the opposite direction.

References Cited

UNITED STATES PATENTS

| | | | |
|---|---|---|---|
| 1,453,852 | 5/1923 | Mahoney | 156—544 X |
| 3,247,045 | 4/1966 | Bursak | 156—555 X |
| 3,459,841 | 8/1969 | Seiler | 264—89 X |
| 2,730,160 | 1/1956 | Pickering | 156—497 |

GEORGE F. LESMES, Primary Examiner

L. T. KENDELL, Assistant Examiner

U.S. Cl. X.R.

156—156, 324, 361, 459, 461, 536, 544